Feb. 3, 1931.  O. W. HEISE  1,791,240
DIFFERENTIAL INDICATOR
Filed Dec. 17, 1925  4 Sheets-Sheet 1

Inventor
Otto W. Heise
by Roberts Roberts Cushman
Att'ys.

Feb. 3, 1931. O. W. HEISE 1,791,240
DIFFERENTIAL INDICATOR
Filed Dec. 17, 1925 4 Sheets-Sheet 2

Inventor
Otto W. Heise
by Roberts Roberts & Cushman
Att'ys.

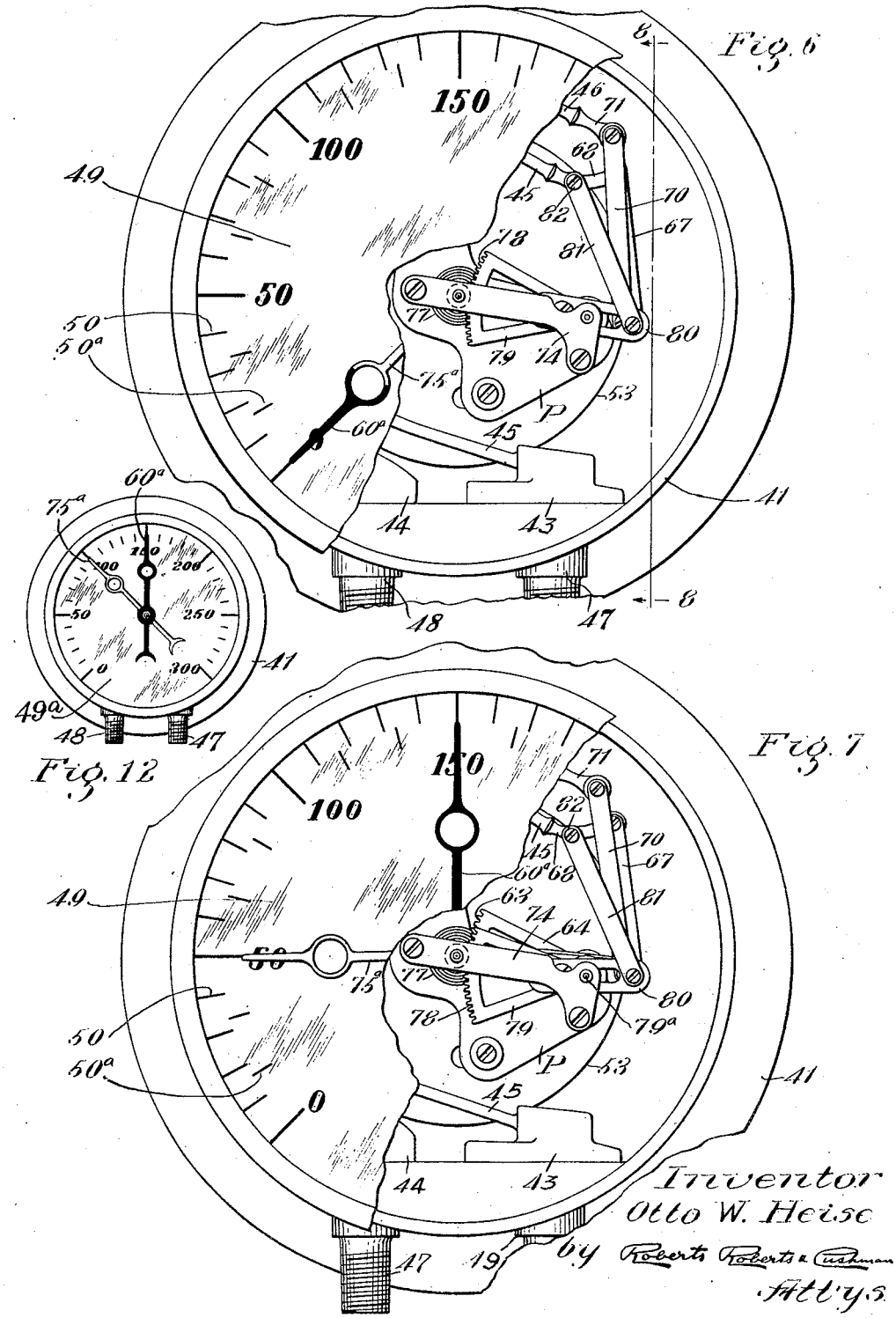

Feb. 3, 1931.   O. W. HEISE   1,791,240
DIFFERENTIAL INDICATOR
Filed Dec. 17, 1925   4 Sheets-Sheet 4
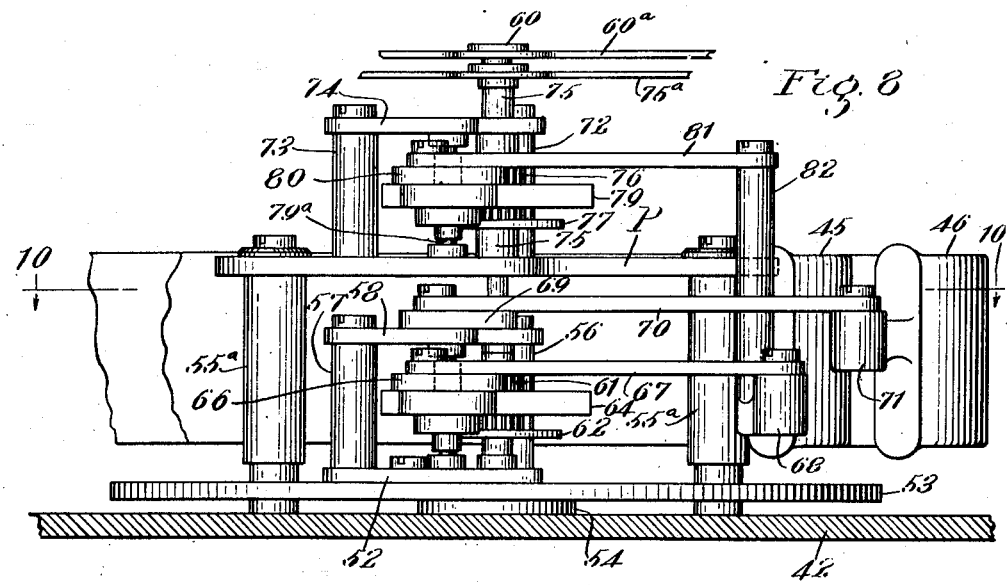
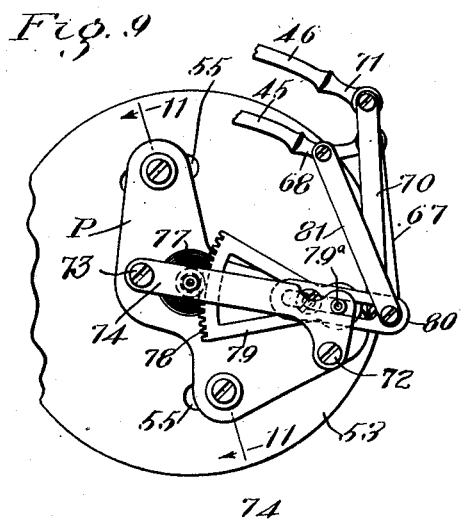 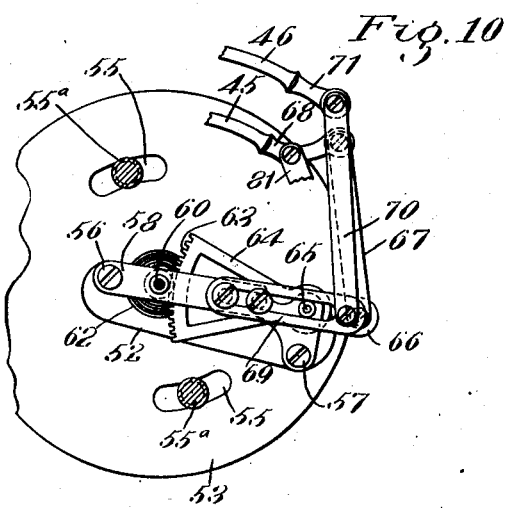
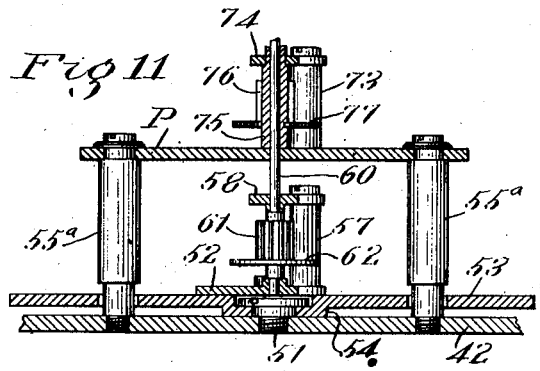
Inventor
Otto W. Heise
by Roberts Roberts & Cushman
Att'ys.

Patented Feb. 3, 1931

1,791,240

UNITED STATES PATENT OFFICE

OTTO W. HEISE, OF BRIDGEPORT, CONNECTICUT, ASSIGNOR, BY MESNE ASSIGNMENTS, TO CONSOLIDATED ASHCROFT HANCOCK COMPANY, OF NEW YORK, N. Y., A CORPORATION OF DELAWARE

DIFFERENTIAL INDICATOR

Application filed December 17, 1925. Serial No. 75,991.

This invention relates to indicating instruments and more particularly to devices for indicating or measuring the comparative values or relationship of certain physical characteristics of a material substance or substances and preferably the absolute value as well of one or more of such characteristics. In the specific exemplification of the invention herein chosen for illustration, it is embodied in a pressure gauge adapted to indicate pressure differences in fluids or gases at different sources or contained in different vessels and in certain adaptations is arranged to show also the absolute pressure of the fluid or gas at one of said sources or vessels.

For example, in steam locomotive practice it is desirable for the engineer to be able at any time to determine the effective working pressure, that is to say the steam pipe pressure diminished by the back pressure at the cylinder exhaust since this effective pressure is that which produces useful work. In most cases it is also desirable for the engineer to know the steam pipe pressure since comparison of the latter pressure with the effective pressure or the back pressure enables him to gauge the efficiency of operation.

Accordingly the present invention has for its object the provision of a differential indicator which in a specific embodiment herein chosen for illustration will show at a glance the effective pressure in a system as determined by mechanical comparison of two fluid pressures, for instance, the supply pressure and the exhaust pressure of an engine and which in its preferred embodiment also indicates the absolute value of one at least of such pressures, for example, the supply pressure.

A further object is to provide a single instrument adapted to permit the observer to obtain the desired information at a glance and to embody the invention in a simple, compact and durable construction which may be manufactured at a reasonable cost.

In the first arrangement to be described, only the effective working pressure is indicated, such pressure being shown directly by the position of an index upon a graduated scale. This arrangement is useful and desirable for many purposes but I prefer the second of the arrangements hereinafter described, since the latter indicates the difference in pressure between the sources or vessels at which the pressures are to be compared and thus for example, in locomotive practice enables the engineer to determine from moment to moment, whether the valves are properly adjusted to obtain the most efficient operation. In this latter arrangement, I prefer to exaggerate this pressure difference as compared with the scale upon which the absolute supply pressure is indicated so as more readily to permit small differences to be observed and I also preferably so arrange the parts that the existence of back pressure and its approximate amount may be noted at a glance by visual comparison of the relative position of two indices without necessitating the reading of numerals or requiring mental subtraction to determine the pressure drop, this being an important consideration in locomotive practice where the engineer must give his attention as fully as possible to the track and signals.

While locomotive practice has been referred to as a specific instance of an environment in which the present invention is highly useful, I wish it to be understood that it is not in any way confined to this particular use, but is of broad utility in engineering practice, where it is desirable to observe differentials in the physical characteristics of fluids or other media employed.

In the accompanying drawings, which illustrate by way of example certain embodiments of the invention above referred to—

Fig. 6 is a view similar to Fig. 1 but illustrating a modified and preferred construction;

Fig. 7 is a view similar to Fig. 6 but showing the parts in another position;

Fig. 8 is a fragmentary section to larger scale substantially on line 8—8 of Fig. 6;

Fig. 9 is a view of the gauge movement of Fig. 6, omitting the casing and certain other parts, showing the operative elements in their normal position when the gauge is not subjected to pressure;

Fig. 10 is a horizontal section to smaller scale substantially on line 10—10 of Fig. 8;

Fig. 11 is a fragmentary section substantially on the line 11—11 of Fig. 9; and

Fig. 12 is a front elevation to small scale illustrating a dial arrangement of a form somewhat different from that shown in Figs. 6 and 7.

Figure 1:
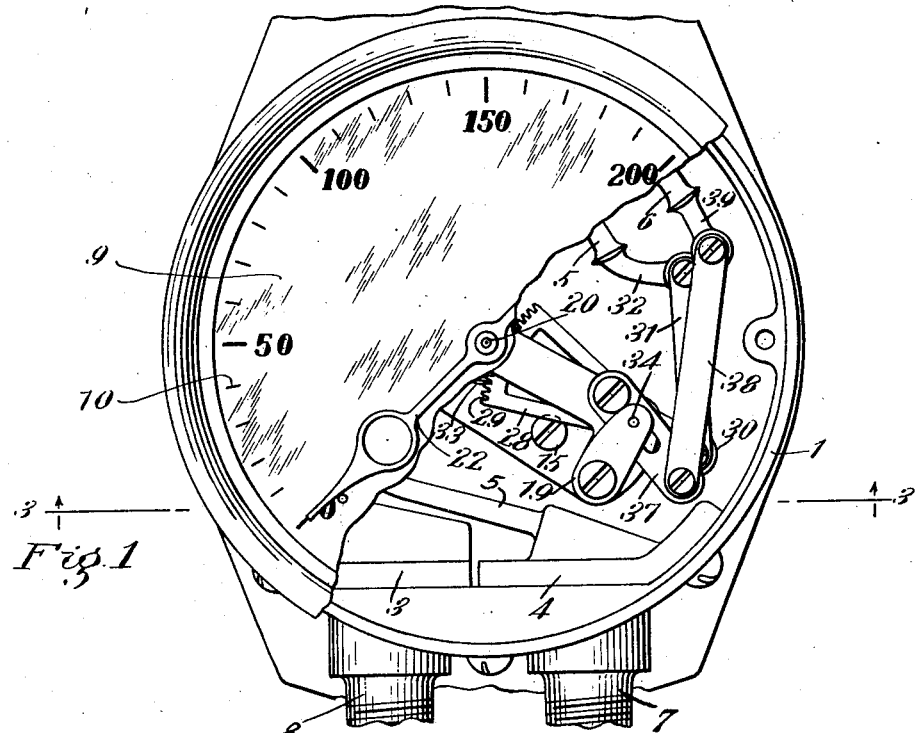
Fig. 1 is a front elevation of a pressure gauge, a portion of the dial being broken away to show the gauge movement, the parts being in normal position.

Referring particularly to Figs. 1 to 5 the numeral 1 indicates the usual casing employed for protecting the gauge movement and for supporting the various parts. This casing comprises the back wall 2 and has mounted within it supports 3 and 4 for a pair of Bourdon tubes 5 and 6 which may be regarded as specific examples of any suitable type of pressure responsive device. These Bourdon tubes are supported independently of one another and are preferably arranged in substantially concentric relation, the tube 5 being of smaller diameter than the tube 6. The tubes 5 and 6 are connected respectively with nipples 7 and 8 adapted to be connected to pressure supply pipes and when pressure above normal atmosphere pressure is admitted to these tubes, the free extremities of the two tubes tend to move outwardly in the same general direction. Preferably for convenience in construction, the free ends of the tubes are disposed adjacent to one another.

While the term "pressure fluid" is employed in describing the operation of these tubes, it is to be understood that this term is used merely for convenience and in a relative sense, since pressure below atmospheric could be employed if desired. For the sake of clearness in further description, it may be understood that an increasing pressure will be referred to as positive or plus pressure and that a decreasing pressure will be referred to as negative or minus pressure, without any reference whatsoever to the datum line employed.

The casing supports a suitable dial 9 in the usual manner, such dial being furnished with a graduated scale 10 and being protected if desired by means of a glass or other transparent cover plate.

The rear wall 2 of the casing (Fig. 5) is provided with a screw-threaded socket for the reception of the threaded end of a shouldered stud 11. This stud forms a pivot for a swinging support comprising the plates 12 and 13. The plate 13 is preferably provided with a hollow boss 14 projecting from its lower face and which bears against the inner face of the member 2 and thus spaces the main body of the plate 13 from the latter. This boss also provides a socket for the reception of the head of the stud 11. The plate 12 covers the head of the stud 11 and is secured to the plate 13 by means of screws 15 or in any other suitable manner.

Spacer posts 16 and 17 are mounted upon the swinging support comprising the plates 12 and 13 and these posts carry a plate 18 in spaced relation to the swinging support. The post 17 is continued above the plate 18 as shown at 17ª in Fig. 3 and carries an overhanging bracket 19 at its upper end.

An index staff 20 turns in a journal opening in the plate 18 and its rear end 21 is journaled in an opening in the plate 12, this staff being co-axial with stud 11. This index staff carries an index hand or pointer 22 at its forward end and is provided with a pinion 23 at a point between the plates 18 and 12.

A staff 24 is journaled at its front and rear ends 25 and 27 respectively in the plates 18 and 12 and a gear sector 28 is fixedly secured to this staff 24. The gear sector is provided with teeth 29 which mesh with the pinion 23 in the manner common and well known in gauge construction. The gear sector 28 is provided with a tail piece 30 preferably adjustable in effective length and a link 31 is pivotally secured at one end to this tail piece and at its other end to a bracket 32 attached to the free end of the Bourdon tube 5. The staff 20 is provided in the usual manner with a hair spring 33, one end of which is attached to the staff and the other end of which may conveniently be secured to the post 16.

A staff 34, (Fig. 5) preferably axially aligned with the staff 24, is journaled at one end in the bracket 19 and at its other end 35 in a socket in the plate 18. A member 36 is fixedly secured to the staff 34 and carries an adjustable tail piece 37 to which one end of a link 38 is pivotally secured. The other end of this link 38 is pivotally secured to a bracket 39 attached to the free end of the Bourdon tube 6.

As thus arranged, movement of the tube 6 acting through link 38 and the member 37 swings the support including the plates 12 and 13 as well as the plate 18 in an arcuate path about the axis of the index staff 20. Moreover, movement of the free end of the Bourdon tube 5 tends to swing the gear sector 28 about the axis of the staff 24.

It may be noted that in the arrangement illustrated, outward movement of the end of the tube 5 tends to swing the gear sector 28 in a counter-clockwise direction, while outward movement of the end of the tube 6 moves the staff 24 bodily in an arcuate path about the axis of the index staff 20 and thus in effect swings the gear sector in a clockwise direction, the connection of the tail piece 30 to the link 31 constituting the fixed fulcrum for the gear sector during such movement.

Referring now to the arrangement illustrated in Figs. 6 to 11, the numeral 41 indicates the protecting casing having the rear wall 42 (Fig. 11) and the supporting base members 43 and 44 which carry the Bourdon tubes 45 and 46 respectively. These tubes, as in the previously described arrangement, are preferably substantially concentric with their free ends adjacent to one another and the free ends of both tubes are adapted to move in the same general direction when subjected to pressure of the same sign.

The tubes 45 and 46 are connected respectively to nipples 47 and 48 adapted for the reception of supply pipes and as herein arranged the nipple 47 would ordinarily be attached to the supply pipe through which the higher pressure is delivered.

The gauge is furnished with the usual dial plate 49 and in the preferred construction this dial plate is furnished with concentric scales 50 and 50$^a$. While the scale 50 is indexed to indicate pressures in pounds or other desired units, the index characters are preferably omitted from the scale 50$^a$ and preferably the graduations upon this scale are spaced further apart than those of scale 50. If this latter arrangement be employed, the tube 46 is made more responsive to pressure of a given amount than tube 45 for a purpose hereinafter to be described.

The back wall 42 of the casing is furnished with a screw-threaded aperture or socket preferably at its center for the reception of a shouldered pivot stud 51 (Fig. 11). A supporting plate 53 is mounted upon the stud 51 to swing in a limited arc and this plate is preferably furnished with a hollow boss 54 which bears against the wall 42 and thus spaces the main body of the plate 53 therefrom. This hollow boss 54 receives the head of the stud 51 and the parts are secured in proper assembled relation by means of a cover plate 52 suitably secured to the plate 53.

The plate 53 is provided at one or more points with arcuate slots 55 for the reception of posts 55$^a$ which are secured to the rear wall 42 of the casing and which project forwardly therefrom and support a plate P in parallel relation to such wall 42.

The supporting plate 53 is limited in its swinging movement about the axis of the stud 51 by the posts 55$^a$ which pass through the slots 55 and this swinging support 53 carries a pair of spacer posts 56 and 57 which in turn support a plate 58 in parallel relation to the support 53.

An index staff 60 turns in a suitable opening in the plate 58 and its rear end is journaled in a socket in the cover plate 52. This index staff is co-axial with the stud 51 and is provided with a pinion 61 and with a hair spring 62 as is common in gauge construction. This pinion 61 meshes with the teeth 63 of a gear sector 64 (Fig. 10) which is secured to a staff 65 journaled in bearings in the plates 58 and 52. The gear sector 64 is furnished with a tail piece 66, preferably adjustable, which is pivotally connected to one end of a link 67, the other end of which is pivotally secured to a bracket 68 secured to the free end of the Bourdon tube 45.

An adjustable bar 69 is secured to the plate 58 and one end of a link 70 is pivotally attached to this adjustable bar 69. The other end of this link 70 is pivotally secured to a bracket 71 attached to the free end of the tube 46.

Posts 72 and 73 are mounted upon the plate P and carry a plate 74 in spaced parallel relation to the plate P. A tubular staff or sleeve 75 is mounted upon the forward portion of the index staff 60 between the plate 74 and the plate P, such tubular staff 75 projecting forwardly through the plate 74 and carrying the index hand 75$^a$. The end of the staff 60 projects beyond the end of the hollow staff 75 and carries a second index hand 60$^a$. Preferably the hands 60$^a$ and 75$^a$ are of distinctive appearance. For example the hand 60$^a$ may be black and the hand 75$^a$ may be red. Of course these specific colors are recited merely for illustration as any other distinctively different colors may obviously be employed, while it is also obvious that hands of different shape or size might alternatively be employed.

The staff 75 is furnished with a pinion 76 and the usual hair spring 77 and the pinion 76 meshes with the teeth 78 of a gear sector 79 fixedly secured to a staff 79$^a$ journaled at its opposite ends in the plates 74 and P respectively. The gear sector 79 is furnished with an adjustable tail piece 80 to which one end of a link 81 is pivotally secured. The other end of this link is pivotally attached to a post 82 (Fig. 8) projecting forwardly from the bracket 68 and forming in effect a continuation of said bracket.

As will be noted from the above description, the staffs of the index needles 60$^a$ and 75$^a$ are both connected through the gear sectors 64 and 79 respectively to the Bourdon tube 45, the arrangement being such that outward movement of this tube tends to swing both gear sectors to substantially the same amount in a counter-clockwise direction. While the fulcrum point of the gear sector 79 is fixed and immovable, the staff 65 which forms the fulcrum for the gear sector 64 is bodily movable in an arcuate path since its journals are carried by the movable support comprising the plates 52, 53 and 58. As this support is connected to the tube 46, outward movement of the latter under pressure tends to swing the support in a counter-clockwise direction and considering for the moment that the point of connection of the tail piece 66 of the sector 64 to the link 67 is fixed, such swinging of the support 53 has the effect of swinging the sector 64 in a clockwise direction.

In Fig. 12 a slight modification of the arrangement shown in Figs. 6 and 7 is illustrated, the only substantial difference being that the dial plate 49a is furnished with but one graduated scale having the graduations spaced substantially the same distance apart, the scale being provided with index characters of appropriate type to indicate the pressure or other characteristics to be measured.

The operation of the devices is substantially as follows, the reference being had first to the construction shown in Figs. 1 to 5:

It is assumed that the inner tube 5 is connected to the steam supply pipe of a locomotive and that the outer tube 6 is connected to the exhaust pipe and that the parts normally occupy the position shown in Fig. 1 in the absence of operative pressure. Upon the admission of steam to the supply pipe, the tube 5 will move outwardly, thus in the usual manner swinging the sector 28 in a counter-clockwise direction and causing the index hand 22 to move in clockwise direction over the scale. For example, this hand may travel to the point indicated in dotted lines in Fig. 2 where it indicates one hundred and fifty pounds pressure.

Figure 2:
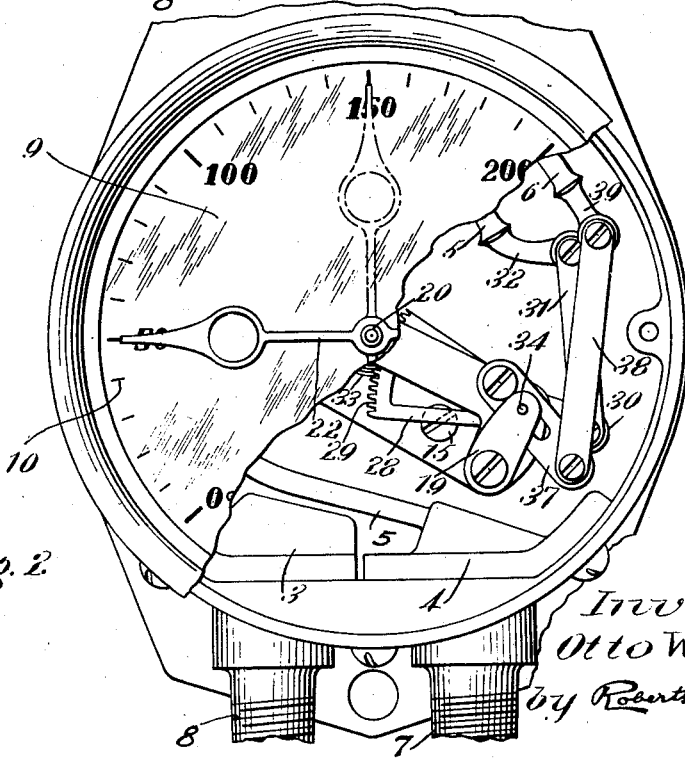
Fig. 2 is a similar view showing the parts in a position which they may assume when the gauge is subjected to pressure.
Figure 4:
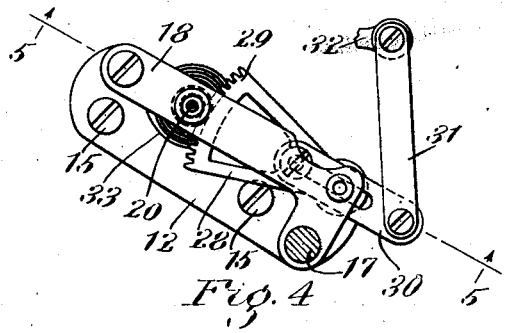
Fig. 4 is a fragmentary section substantially on the line 4—4 of Fig. 3.
Figure 3:
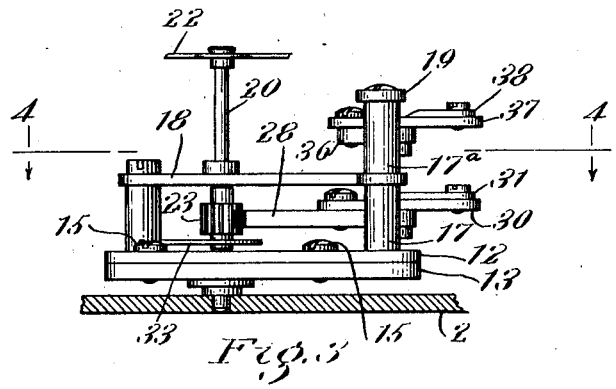
Fig. 3 is a fragmentary section substantially on line 3—3 of Fig. 1 and showing the gauge movement in elevation.
Figure 5:
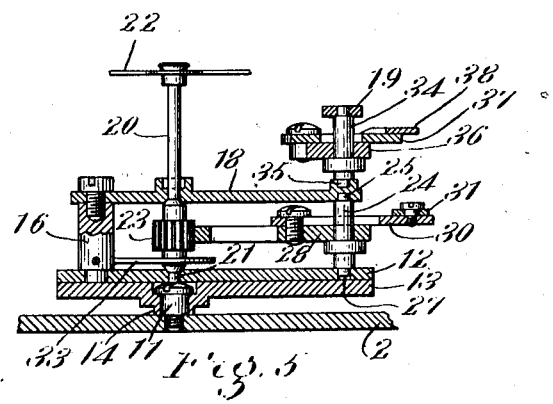
Fig. 5 is a fragmentary section substantially on line 5—5 of Fig. 4 but showing additional parts.

If the locomotive now be started and if ideal conditions exist, that is if there is no back pressure, the parts will retain the position indicated in Fig. 2 with the index hand in the dotted position, since the tube 6 is not subjected to pressure. However, if such ideal conditions are departed from, that is to say, if there is some back pressure, the end of the tube 6 will move outwardly and thus will swing the support comprising the parts 12, 13 and 18, which tends to move the sector 28 in a clockwise direction, thus causing the hand 22 to move backwardly from the dotted line position until it reaches some point such for example as that shown in the full line position in Fig. 2 where it indicates the effective pressure, that is to say, the difference between the supply pressure and the back pressure.

With the arrangement shown in Figs. 1 to 5 the engineer is able at a glance to determine the exact pressure which is available for performing useful work and under certain circumstances this may be sufficient for the purpose particularly if some additional indicating means be provided for showing the boiler pressure.

Referring now to the device shown in Figs. 6 to 11, it being assumed that the tube 45 is connected to the supply pipe and that the tube 46 is connected to the exhaust and also that in the absence of pressure the parts occupy the position shown in Fig. 6, upon admission of the boiler pressure to the tube 45, the latter moves outwardly and simultaneously swings the sectors 64 and 79 in a counter-clockwise direction and to substantially the same extent so that under ideal conditions the index hands 60a and 75a move as a unit and the outer hand always conceals the inner hand, for example both hands may indicate 150 pounds.

If any back pressure now develops at the exhaust the tube 46 will move outwardly and through the connections described will swing the support 53 in a counter-clockwise direction, thus moving the fulcrum point of the sector 64 in such a manner that the sector in effect swings in a clockwise direction. Since this sector does not in any way affect the position of the outer index 60a the latter remains in its former position regardless of the pressure which may be admitted to the tube 46, but on the other hand, the hand 75a is caused to travel backwardly along the scale until it may occupy a position such for example as that indicated in Fig. 7.

If, as above suggested, the tube 46 be more sensitive to pressure than the tube 45, a very slight back pressure may be sufficient to move the hand 75a to a substantial distance backwardly along the scale for example to the point indicated in Fig. 7. In the arrangement shown in Figs. 6 and 7, the scale 50a with which the hand 75a is designed to cooperate is unprovided with index characters it being contemplated that the observer will estimate at a glance from the distance of the hand 75a away from the hand 60a the amount of back pressure, or at least will be able to determine in a general way the fact that the system is operating inefficiently and needs adjustment or repairs.

While the angular relationship of the two index hands thus clearly indicates the degree of efficiency of operation, the hand 60a at all times indicates the true pressure in the supply pipe so that by the use of this single instrument the supply pressure and the drop in pressure between the supply and the exhaust may readily be ascertained.

If the arrangement shown in Fig. 12 be employed, the tubes 45 and 46 will be of the same strength and thus the hands 60a and 75a would move to the same distance over the scale for corresponding pressure changes. In this event the back pressure hand 75a would move rearwardly along the scale to a relatively short distance for ordinary back pressures and the observer could note the exact drop in pounds of pressure between the supply and the exhaust by subtracting the indication upon the scale of the back pressure hand from that of the supply pressure hand. Likewise he could determine the exact amount of the back pressure by reading this directly upon the scale as determined by the position of the hand 75a.

While the preferred arrangement has herein been illustrated and described, it is to be understood that the invention is not necessarily limited to this particular and specific arrangement of parts, but that other and equivalent arrangements may be substituted, that the proportion of parts may be varied as may be desired and that additional index elements with corresponding pressure responsive devices may be employed if desired to indicate other relationships.

While the invention has been described with particular reference to the determination or observation of pressures or pressure relationships, it is clear that the underlying principle of the invention might well be embodied in instruments for measuring other physical characteristics than that of pressure, under which circumstances the pressure responsive devices, such for example, as the Bourdon tubes here disclosed, would be replaced by corresponding devices responsive to such other characteristics as are to be observed or measured.

I claim:

1. Apparatus of the class described comprising co-axial indices, a lever for moving each index, a movable support for the fulcrum of one of said levers, a pressure responsive device, means connecting said device to each lever, a second pressure responsive device, and means for transmitting movement of the latter device to the movable support.

2. Apparatus of the class described comprising co-axial indices, a lever for moving each index, a Bourdon tube, means for transmitting movement from said tube to each of said levers, a second Bourdon tube, and means actuated by the latter tube for shifting the location of one of said levers.

3. Apparatus of the class described comprising concentric index staffs, an index needle mounted upon each staff, a pinion secured to each staff, an oscillatory gear sector meshing with each pinion, a pressure responsive device connected to both gear sectors, a second pressure responsive device, and means actuable by the latter pressure responsive device to move one only of said gear sectors.

4. Apparatus of the class described comprising concentric index staffs, an index needle mounted upon each staff, a pinion secured to each staff, an oscillatory gear sector meshing with each pinion, a movable support for one of the gear sectors, a Bourdon tube connected to both gear sectors for swinging them, a second Bourdon tube, and means actuable by the latter tube to move said support and its related gear sector bodily from normal position.

5. Apparatus of the class described comprising a pair of index staffs, an index needle mounted upon each staff, a pinion secured to each staff, an oscillatory gear sector meshing with each pinion, a pivoted support for one of said sectors, a pair of Bourdon tubes, said tubes responding in the same direction to internal pressure, and means connecting the free end of one of the tubes to the gear sectors and connecting the free end of the other tube to the pivoted support.

6. Apparatus of the class described comprising a pair of concentric index staffs, an index secured to each staff, a pinion secured to each staff, a staff mounted in fixed bearings, a gear sector carried by said staff and meshing with one of said pinions, a support pivoted to swing about the axis of the index staff, a staff mounted upon said support, a gear sector carried by the latter staff meshing with the second pinion, a pair of substantially concentric Bourdon tubes, a link connecting the free end of one tube to both of said gear sectors, and a link connecting the free end of the other tube to the movable support.

7. Apparatus of the class described comprising a pair of concentric rotary index needles, a graduated scale cooperable with each needle, one of said scales being indexed to indicate pressures, a Bourdon tube, means for transmitting movement of the tube in response to pressure increase to both of said needles to move them in one and the same direction over their respective scales, a second Bourdon tube, said second tube moving to a greater extent under a given pressure than the first, and means for transmitting movement of the latter tube in response to pressure increase to one only of said needles, to move the latter in the reverse direction over its scale, the latter scale having unindexed graduations spaced further apart than the graduations of the other scale.

8. Apparatus of the class described comprising a swinging support having a chamber therein, a stud constituting a pivot for the support, said stud having a head disposed within said chamber, spacer posts carried by the support, a plate mounted upon the posts, said plate being spaced from the support, the support and plate having aligned bearing openings coaxial with said pivot stud, an index staff journaled in said bearing openings, a pair of pressure responsive devices, means for transmitting motion from one of said devices to the index staff, and means including relatively adjustable members for transmitting movement from the other pressure responsive device to said support.

9. Apparatus of the class described having a swinging support, said support comprising a plate having a hollow boss projecting from one of its sides and a second plate forming a cover for the chamber within said boss, a pivot stud having a head disposed in said chamber, a gauge movement including an index staff carried by the support, pressure responsive devices, means for transmitting movement from one of said devices to the gauge movement, and means transmitting movement from another of said devices to the support.

10. Apparatus of the class described having a casing provided with a wall, a swinging support, said support comprising a plate disposed in a plane substantially parallel to said wall of the casing, the plate having a hollow boss projecting toward said wall, the outer end of the boss having a journal opening therein, the shouldered stud having a head disposed within the hollow boss and a bearing portion fitting within the journal opening in the boss and forming a pivot for the support, the end of the stud being secured to the wall of the casing, a second plate constituting a cover for the hollow boss, a gauge movement mounted upon the support, said movement comprising an index staff coaxial with the stud, a pair of Bourdon tubes, means for transmitting movement from one tube to the gauge movement whereby to turn the index staff, and means for transmitting movement from the other tube to said support whereby to swing the latter about the stud as a pivot.

Signed by me at Bridgeport, Connecticut, this 15th day of December 1925.

OTTO W. HEISE.